(12) United States Patent
Meunier et al.

(10) Patent No.: US 11,885,227 B2
(45) Date of Patent: Jan. 30, 2024

(54) SENSOR-BASED CALCULATION OF SERVICE INTERVALS FOR GAS TURBINES

(71) Applicant: Siemens Energy Global GmbH & Co. KG, Munich (DE)

(72) Inventors: Regine Meunier, Munich (DE); Davood Naderi, Svärtinge (SE); Erik Aerlebaeck, Svärtinge (SE); John Ayotte, Nyköping (SE)

(73) Assignee: Siemens Energy Global GmbH & Co. KG, Munich (DE)

( * ) Notice: Subject to any disclaimer, the term of this patent is extended or adjusted under 35 U.S.C. 154(b) by 641 days.

(21) Appl. No.: 17/048,581

(22) PCT Filed: Apr. 17, 2019

(86) PCT No.: PCT/EP2019/059874
§ 371 (c)(1),
(2) Date: Oct. 17, 2020

(87) PCT Pub. No.: WO2019/214916
PCT Pub. Date: Nov. 14, 2019

(65) Prior Publication Data
US 2021/0372294 A1     Dec. 2, 2021

(30) Foreign Application Priority Data

May 8, 2018     (EP) .................................... 18171247

(51) Int. Cl.
*F01D 21/00*     (2006.01)
*G05B 23/02*     (2006.01)

(52) U.S. Cl.
CPC ....... *F01D 21/003* (2013.01); *G05B 23/0221* (2013.01); *F05D 2220/32* (2013.01)

(58) Field of Classification Search
None
See application file for complete search history.

(56) References Cited

U.S. PATENT DOCUMENTS 9,046,000 B2    6/2015  Kominsky
2004/0073400 A1  4/2004  Tomita et al.
(Continued)

FOREIGN PATENT DOCUMENTS

EP     1408214 A2    4/2004
EP     2829935 A2    1/2015

OTHER PUBLICATIONS

PCT International Search Report and Written Opinion of International Searching Authority dated May 7, 2019 corresponding to PCT International Application No. PCT/EP2019/059874 filed Apr. 17, 2019.

*Primary Examiner* — Sean Shechtman

(57) ABSTRACT

A method and a calculation unit for calculating a load skewness result for a determination of service intervals for a turbine, includes: receiving a continuously measured load signal over time, indicating a load of the turbine during operation thereof; determining a load percentage signal over time as a deviation of the received measured load signal from a maximum capacity signal, wherein the maximum capacity signal represents a maximal possible load to be generated at a given time and is calculated from continuously measured sensor signals, representing operating parameters of turbine operation; calculating a load percentage distribution based on the determined load percentage signal; calculating a load skewness factor as a measure of an asymmetry of the calculated load percentage distribution; providing the load skewness result, including the calculated load percentage distribution and the calculated load skewness factor.

13 Claims, 4 Drawing Sheets

(56) References Cited

U.S. PATENT DOCUMENTS

2004/0148129 A1     7/2004   Gotoh et al.
2016/0230676 A1     8/2016   Huang et al.

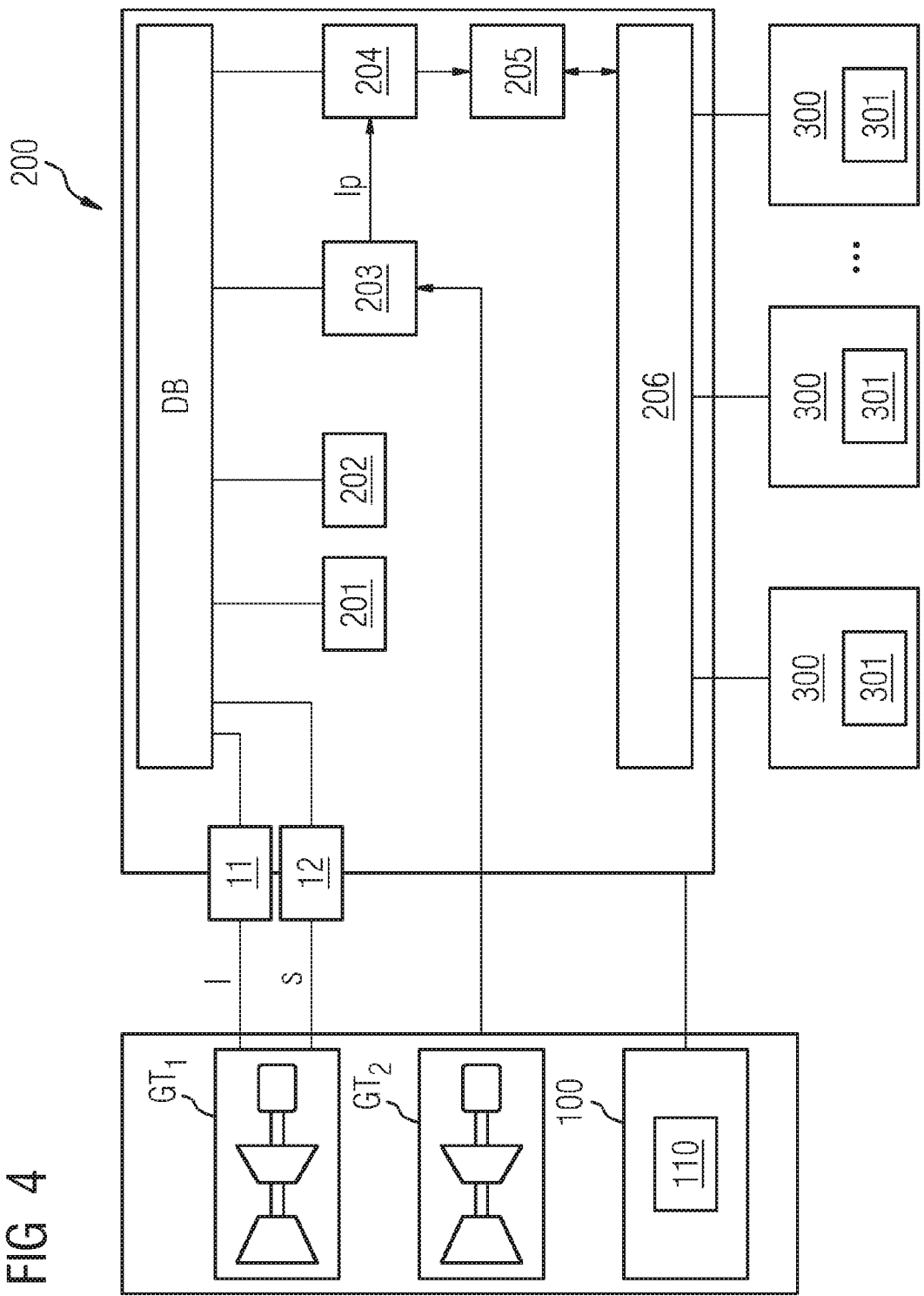

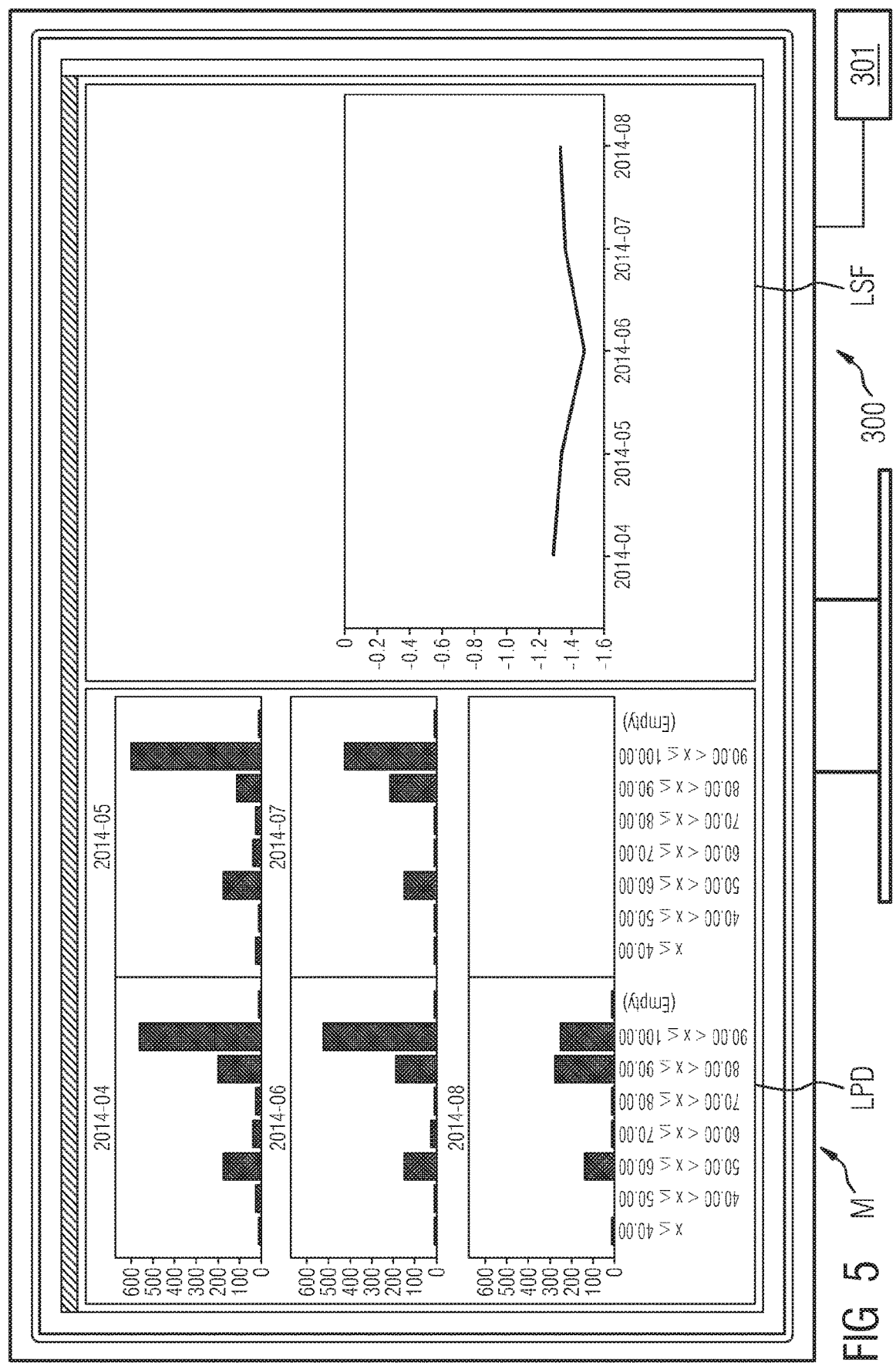

SENSOR-BASED CALCULATION OF SERVICE INTERVALS FOR GAS TURBINES

CROSS REFERENCE TO RELATED APPLICATIONS

This application is the US National Stage of International Application No. PCT/EP2019/059874 filed 17 Apr. 2019, and claims the benefit thereof. The International Application claims the benefit of European Application No. EP18171247 filed 8 May 2018. All of the applications are incorporated by reference herein in their entirety.

FIELD OF INVENTION

The invention relates to a method for calculating a load skewness result (LSR) for a determination of service intervals for a turbine.

BACKGROUND OF INVENTION

Gas turbines are used for power generation in various production facilities by converting fuel energy into mechanical power or—by connecting to electric generators—electric power. The underlying thermodynamic cycle involves the compression of a gaseous medium (typically air), the addition of fuel energy through combustion or heat exchange, and expansion of the hot, compressed gas through a turbine to convert the thermal energy into shaft power. In contrast to an ideal thermodynamic cycle, a real gas turbine cannot perform these processes free of friction and losses.

Gas turbines are complex systems with a plurality of parts which need to operate correctly to safeguard turbine operation. In order to safeguard correct operation of a gas turbine, service intervals need to be defined. Various technical factors are influencing a gas turbine's service plan and service intervals.

The purpose is to achieve highest possible reliability and availability without jeopardizing safety. To fulfill these requirements, preventive and condition-based maintenance philosophies are applied to these machines since decades back.

A core concept is to replace the risky components before the actual failure to avoid unplanned downtime or safety-related incidents. On the other hand, these components are expensive and therefore postponing the exchange thereof can save a lot of resources. To find the optimum replacement time to maximize reliability, availability and minimize cost and downtime has been a challenging task for engineers.

The removal time of the components depends on the dominant failure mechanism(s) per critical location per components which in turn depends on the material, mechanical loading, temperature, speed and several other parameters.

These parameters themselves depend on the usage of the machine in terms of the hours, load level and operation cycles. As this is a very complex situation, engineering departments calculate the expected necessary service intervals per critical components, considering all the uncertainties in material properties, loading, numerical models and so on. The "technical life" of the components depends inter alia on gas temperature, wall thickness, cooling air flows, coating thickness and other material properties.

In state of the art it is known to use a deterministic approach for the calculation which assumes fixed values for the parameters. Due to scatter in the parameters and to overcome the uncertainty, a "safety factor" is used.

Another known concept is to use so called equivalent operating hours (EOH) or equivalent cycles (EOC) as the measure of time to activity.

The EOH/EOC concept is based on the following technical background.

Technical operating parameters of the turbine have a strong influence on wear and tear of the components. For example, rapid changes in the turbine inlet temperature and operating periods at gas temperatures exceeding those of base load cause additional stresses on the hot-gas-path items. The effect of such stresses on the service life of these items is allowed for by determining the equivalent operating hours (EOH) at base load stress. For this purpose, various process events and operating hours in the various temperature ranges are assigned individual factors which are then totaled.

Actual operating hours are usually less than the equivalent operating hours (EOH), because—as explained above—the concept of EOH is based on the technical observation that wear and tear of the part of the turbine correlate with operating conditions.

Therefore, one key factor for the operating conditions is the load level with which the turbine is operated (as a measure of provided energy).

In state of the art it is known to use preventive maintenance operations to reduce breakdowns and the costs associated with them. However, costs for maintenance operations are high. Therefore, substantial efforts have been invested in minimizing the expected total cost due to failures and preventive maintenance of industrial equipment. In state of the art, most preventive-maintenance approaches include the use of fixed schedules, optimized in advance for minimum cost.

However, there are many situations in which maintenance re-planning is necessary to operate with as low cost as possible. For example, unexpected breakdowns force the production unit to stop for emergency repair and performing other maintenance tasks at the same time can save time and money. In addition, the type of operation (base load, peak load, trips, starts) is a key factor for calculating maintenance schedules.

SUMMARY OF INVENTION

It is an object of the present invention to dynamically calculate service intervals for a turbine by considering operating parameters of the turbine and, in particular, the load level. Further, the operating conditions of the turbine should be analyzable more efficiently.

This object is achieved by the subject matter according to the independent claims with the claimed features. Advantageous embodiments are the subject matter of the dependent claims, the description and the figures.

According to a first aspect the present invention refers to a method for calculating a load skewness result for a determination of service intervals for a steam or gas turbine, based on historical and continuously measured sensor data. Typically, the sensor data are acquired during earlier operation of the steam or gas turbine and represent the turbine's operating conditions. The method comprises the following steps: —Receiving a continuously measured load signal over time, indicating a load of the turbine during operation thereof; —Determining a load percentage signal over time as a deviation of the received measured load signal from a maximum capacity signal (over time), wherein the maximum capacity signal represents a maximal possible load to be generated at a given time, based on continuously measured sensor signals, representing operating parameters (for example temperature, pressure, humidity of inlet air . . . ); —Calculating a load percentage distribution based on the determined load percentage signal; —Calculating a load skewness factor as a measure of an asymmetry of the calculated load percentage distribution; —Providing the load skewness result, comprising the calculated load percentage distribution and the calculated load skewness factor. At least part of the load skewness result (in particular the load skewness factor) may be provided as a pattern over time. It may be provided for a specific fleet of turbines (where a fleet can consist of just one or several turbines) and a specific time period, and with the calculated load skewness factors.

The method is computer implemented. All steps are executed on a computing device. Thus, the method is executed by employing at least one processing entity configured to execute computer-executable instructions stored in a memory to store the sensor data and to perform the steps, mentioned above. The method may be used to evaluate and assess failures and failure risks during operation of a turbine and/or for an improvement for the determination of maintenance intervals.

The method is based on continuously detected sensor data of the turbine during operation. As an advantage, the present solution uses dynamically measured data, recorded at the turbine, representing how long and often their gas and steam turbines have run. Thus, the type of operation and relevant operational parameters of the turbine are captured by sensors and are fed into a processing unit.

In the following the invention will be described with respect to a gas turbine. However, a person skilled in the art, will understand, that the basic principle of this invention may in particular be applied different kinds of gas turbines, like heavy-duty, industrial, for example, ranging from 4 to 567 MW, and/or aeroderivative gas turbines, and to steam turbines as well (provided that steam-related ambient parameters or conditions are considered).

In an embodiment of the present invention, the load skewness factor (LSF) is calculated by:

$$LSF = \frac{n\sqrt{n-1}}{n-2} \frac{\sum_{i=1}^{n}(x_i - x_{avg})^3}{\left(\sum_{i=1}^{n}(x_i - x_{avg})^2\right)^{\frac{3}{2}}},$$

wherein n is the number of samples. A sample is a value of the load percentage signal at given time. $x_i$ is the value of each load percentage signal and $x_{avg}$ is the arithmetic mean of all load percentages. 'n' is to be construed as the total number of data points within the length of the signal. 'n' obviously depends on the sampling rate or resolution. The specific calculation of the load skewness factor according to the formulae above, has the advantage that the development of the normalized load may be coded within one parameter or factor.

According to another embodiment of the present invention, the measured sensor signals, which represent the operating parameters (or conditions), comprise a temperature signal, a pressure signal, a humidity signal of inlet air to the gas turbine, a heating signal for the fuel, an outlet pressure signal for outlet exhaust gases of the gas turbine. In more complex embodiments, additionally other operating parameters may be considered.

According to another embodiment of the present invention, the load skewness result is visualized for a specific fleet and/or a specific time period. It is to be noted, that a load skewness factor is always for a fleet (a set of turbines, maybe only one) and a time period. Preferably, the load skewness result comprises two result items: First, the load percentage distribution over time and second, the load skewness factor. This has the advantage and technical effect, that all necessary information of the complex correlations of the gas turbine operation may be provided by means of these two items in a very efficient manner. The load skewness result may be visualized on a graphical user interface. The result usually comprises the load percentage distribution. As the load percentage distribution is a distribution it does not have a timeline, but it can be shown for several consecutive time periods. Several load skewness results may be delivered and visualized together in a common representation e.g. for the purpose of comparison. Thus, it is possible to visualize one or several load skewness results, e.g. for several, different, single turbines and the same time period or for a single turbine and several, different months or several, different fleets of turbines and the same time period. Further, several load skewness factors for different fleets and time periods can be provided and then visualized and compared.

According to another embodiment of the present invention, the measured load signal and the determined load percentage signal are historical data (i.e. from prior gas turbine operations), which may be stored locally on a memory at the site of the gas turbine. Alternatively, the data may be stored centrally (i.e. on a central server). This has the technical advantage, that the calculation of the service intervals for the turbine may be provided more specifically, namely on turbine-specific and operation-specific parameters. With this feature, discrepancies may be detected, which may be caused by the fact that the plant operator intends to operate the turbine under different conditions as the turbine is actually operated. Thus, the difference between an 'intended operating mode' and a 'measured real operating mode' (real site conditions) are detectable and may be used for communication with the plant operator with respect to the definition of service intervals.

According to another embodiment of the present invention, the load skewness result comprises an accuracy result dataset. This dataset is calculated by measuring a difference between expected values for the load skewness result (e.g. load-based signals, like the calculated load percentage distribution or its load skewness factor) when the probabilistic life time is estimated based on assumptions of the load in the future life with currently measured values thereof. This helps, to provide a more detailed analysis and to dynamically adapt the constantly and continuously executed calculation of probabilistic life times for the turbine and its components. In other words, this feature serves as adaptive control of the calculation of probabilistic life times and service intervals, whereas the difference between two load distributions is not straightforward and rules for its calculation must be defined, the difference between two load skewness factors—to the contrary (as being values) is simple, since it is just the mathematical difference.

According to another embodiment of the present invention, the calculated load skewness factor is used for determination of future service intervals and/or calculation of probabilistic life times of the gas turbine and its components. The load skewness factor may, thus, be directly used for a computer-based tool for planning and/or prediction of maintenance related data.

According to another embodiment of the present invention, the measured load signal and the determined load percentage signal are received and pre-processed by checking formal correctness of the data. It may be evaluated whether the received data are within a predetermined admissible range. This improves quality of the system for only processing evaluated and checked data.

According to another embodiment of the present invention, the provided load skewness result is used for calculation of probabilistic lifetime of the gas turbine and its components, wherein the calculation is modeled such that the continuously measured operating conditions dynamically influence the continuously calculated probabilistic lifetime. In this respect, it must be pointed out that the calculated service interval related data, comprising the load signals and the calculated probabilistic lifetime, are calculated continuously and constantly and not stepwise. This improves detailedness of the provided solution. Also, outliers and unusual load scenarios are detected and represented accordingly.

In another aspect the invention refers to a computer-based calculation unit for calculating a load skewness result for determination of service intervals for a turbine, based on historical and continuously measured sensor data representing turbine operating parameters, comprising:—A load interface for receiving a continuously measured load signal over time, indicating a load of the turbine during operation thereof; —An operating interface for determining a load percentage signal over time as a deviation of a received load signal from a maximum capacity signal (over time), wherein the maximum capacity signal represents a maximal possible load to be generated at that time, based on continuously measured sensor signals, representing operating parameters; —A processor, which is adapted to determine a load percentage distribution based on the determined load percentage signal and wherein the processor is further adapted to calculate a load skewness factor as a measure of an asymmetry of the calculated load percentage distribution; the load skewness factor may be calculated as a signal over time; —An output interface for providing the load skewness result, comprising the calculated load percentage distribution and the calculated load skewness factor.

The output interface may be provided as user interface for visualization of the load skewness result.

Preferably, the determined service intervals are component-specific. I.e. for each of the different components of the turbine, different and specific service intervals and lifetimes are calculated. For this reason, each particular component is associated to a particular formula for calculating the same. Generally, the load signal is the same for all components of the whole gas turbine, therefore, also the load percentage signal is the same. But the different components have different formula for the calculation of the lifetime of the component. In these different formulae the load skewness factor can be used instead of load classes as in state of the art.

The terms used within this application are defined in the following.

Service intervals are planned schedules for execution of maintenance operations of the turbine. Maintenance operations must be performed on the gas turbine at regular intervals. As with any plant operation will lead to wear and tear. It is the function of maintenance to detect and influence wear and tear and to generate new wear and tear reserves by way of repairing. Maintenance intervals are to be calculated so that all operations may be performed on the gas turbine including its auxiliary systems in operation or on stand-by without impairing availability. Since stress on the hot items (combustion chambers and turbine blades) is especially high, it is expedient to base the intervals on the cumulative operating stress (represented in operating parameters) of these items.

The load signal refers to the current and actual load, which is currently generated by turbine operation. The load signal represents the load of the turbine. It may be measured in Kilowatt (KW) or Megawatt (MW). The load signal may be measured by means of respective sensors. The load sensors are advantageously located at the generator. A generator's load is measured by a power sensor circuit of a load sensor. The power sensor circuit senses both current amplitude and phase between voltage and current of the generator's output. The potential income comes from the potential transformer(s) and the current input comes from the current transformer(s). The circuit uses these two input signals to generate a load signal which is then filtered and sent to a controller circuit. The load signal voltage of each generator set will be proportional to the load on that generator set.

The maximum capacity signal is a calculated signal which provides the maximum possible load to be generated by the turbine at each point in time. The calculation of the maximum capacity signal incorporates operating conditions for operation of the turbine. These operating conditions comprise temperature, pressure, humidity of the inlet air, fuel, the heating value of the fuel, outlet pressure and others. The maximum capacity signal is a signal which is relatively stable. If the nominal capacity of a gas turbine is e.g. 50 MW, then the maximum capacity signal depends on the location where the turbine is and on the current operating conditions. In a specific region with its usual condition it might be a little less or little more than 50 MW. If the conditions slightly change during the course of operation, the maximum capacity also changes. However, it does not vary as much as the load signal or the load percentage signal, which both depend on the use of the turbine and how much energy is currently produced. The maximum capacity signal is usually not shown on a user interface (e.g. on a dashboard) since it is only used to calculate the load percentage signal from the actual load (signal).

The load percentage signal is a signal over time. It represents a deviation of a received load signal from a maximum capacity signal (over time), wherein the maximum capacity signal represents a maximal possible load to be generated at that time, based on continuously measured sensor signals, representing operating parameters, as mentioned above. The load percentage signal is a normalized signal with respect to theoretically achievable values.

The load percentage distribution is a statistic frequency distribution. It displays the frequency of various outcomes in a sample and here, specifically, of the load related signals, i.e. the load percentage signals of the turbine. The load percentage distribution may be structured in form of a table or graph, indicating the occurrences of (load) values within a specific group or bin (e.g. a first bin 90-100%, a second bin 80-90% and a third bin 70-80%).

The load skewness result is an electronic dataset, comprising two items: the calculated load percentage distribution and the calculated load skewness factor. Both items may be provided in a graphic representation. The provisioning of the two-component load skewness result improves usability within a planning tool for determination of service intervals and maintenance. The calculation and display of the load skewness factor provides one single technical parameter, which is a key indicator for calculation of service intervals and potential adaptations.

The load skewness factor can be positive or negative. It depends on the symmetry of the respective corresponding load percentage distribution. If the load percentage distribution is symmetric, then the mean is equal to the median and the distribution has zero skewness (load skewness factor=0). If the distribution is right-skewed (data more on the left), then the load skewness factor is positive. If the load data is left-skewed (which is the usual case), the load skewness factor is negative. The load skewness factor measures or represents if the distribution of the load is symmetric or more on the higher load values or more on the lower load values.

In another aspect the invention refers to a computer program, tangibly embodying a program of machine-readable instructions executable by a digital processing apparatus to perform a method described above, if the program is executed on the digital processing apparatus. In particular, the computer program is adapted to execute the steps of:
—Receiving the continuously measured load signal or directly and continuously measuring the load signal; —Determining the load percentage signal as normalized signal with respect to the maximum capacity signal; —Calculating the load percentage distribution, the load skewness factor and—Providing a load skewness result.

The computer program may be processed in a distributed manner, such as that certain steps are performed on a first computing entity (e.g. at the turbine) and that other steps are performed on a second computing entity (e.g. on a central server).

The computer program may be offered, placed on market, used, imported and/or stored as (and thus may be part of) a computer program product. Thus, the computer program may be provided on a storage medium (computer readable medium, like a computer disc or a memory stick etc.). Alternatively, the computer program may be provided via download by means of a respective network connection to a server, which stores the computer program by providing a link to the server with the computer program stored thereon. A "computer-readable medium" or "storage medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The term "computer" refers to any electronic device comprising a processor, such as a general-purpose central processing unit (CPU), a specific purpose processor or a microcontroller. The processor is adapted to execute a special computing task, namely for providing the load skewness result. A computer can receive data (an input), of performing a sequence of predetermined operations thereupon, and of producing thereby a result in the form of information or signals (an output). Depending on context, the term "computer" will mean either a processor or can refer more generally to a processor in association with an assemblage of interrelated elements contained within a single case or housing.

The systems and methods described herein may be embodied by a computer program or a plurality of computer programs, which may exist in a variety of forms both active and inactive in a single computer system or across multiple computer systems. For example, they may exist as software program(s) comprised of program instructions in source code, object code, executable code or other formats for performing some of the steps. Any of the above may be embodied on a computer readable medium, which include storage devices and signals, in compressed or uncompressed form.

In another aspect the invention refers to a use of the load skewness result to assess the risk of failures during operation of a turbine device and for related computational processing and to optimize the maintenance intervals of a turbine device or combinations thereof.

The following detailed description of the figures uses the drawings to discuss illustrative embodiments, which are not to be construed as restrictive, along with the features and further advantages thereof.

BRIEF DESCRIPTION OF THE DRAWINGS

FIG. 4 is a schematic overview of the system architecture according to an embodiment of the invention with different client sites and a server site of a system for calculation of service intervals and FIG. 5 is a schematic drawing of a dashboard on a monitor.

DETAILED DESCRIPTION OF INVENTION

Figure 1:
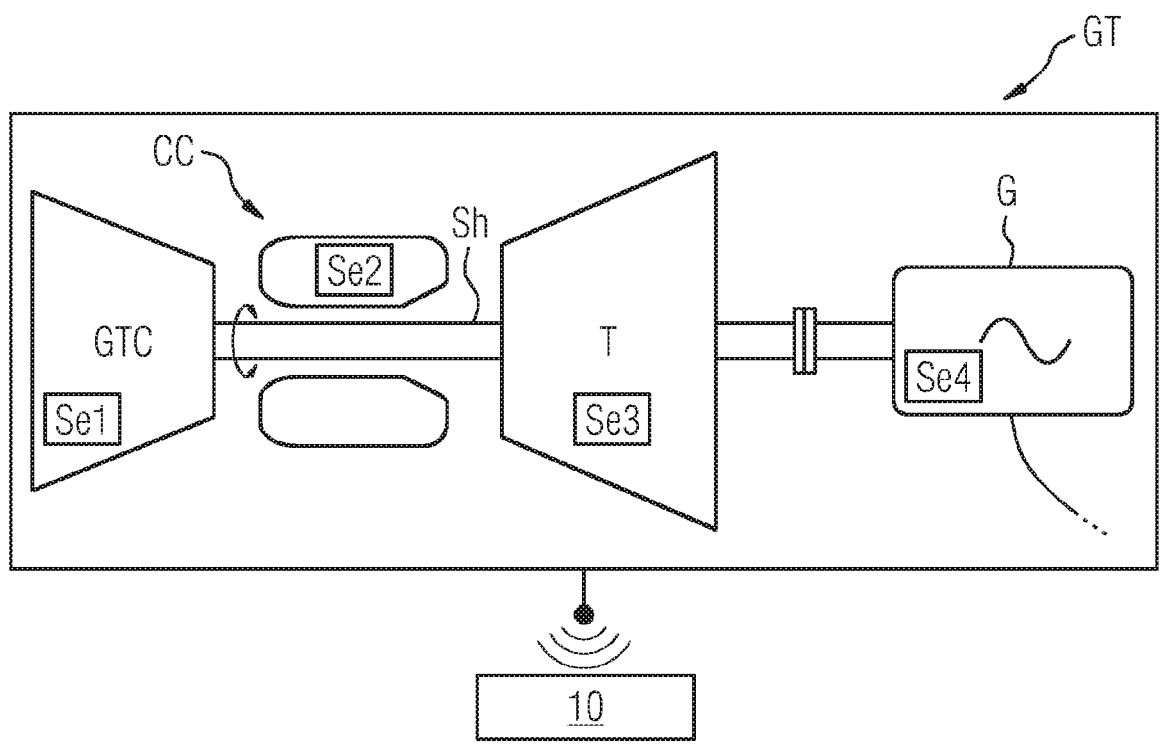
FIG. 1 shows a schematic drawing of a gas turbine with components and sensors and an associated calculation unit.

FIG. 1 shows a gas turbine GT in data connection with a calculation unit 10. The gas turbine GT is a type of continuous combustion, internal combustion engine. It comprises three main components: 1. An upstream rotating gas compressor GTC; 2. A downstream turbine T on the same shaft Sh; 3. A combustion chamber CC or area, called a combustor, in between compressor GTC and turbine T above. 4. A fourth component is used to convert power into mechanical or electric form, e.g. an electric generator G.

The basic operation of the gas turbine is a so-called Brayton cycle with air as the working fluid. As can be seen in FIG. 1, the gas turbine is equipped with a plurality of sensors Se (in FIG. 1 schematically shown as Se1, Se2, Se3, Se4), which serve to acquire sensor data.

The sensor data indicate operating parameters of the turbine during operation. The sensor data inter alia represent temperature, pressure, humidity of inlet air and other physical and mechanical parameters, representing the turbine's operating conditions.

The turbine GT and the sensors Se are in data connection with a calculation unit 10. The calculation unit 10 serves to calculate a load skewness result for a determination of service intervals for the turbine GT, based on historical and continuously measured sensor data of turbine operation. The data connection may be implemented via a network, e.g. a mobile network to deliver data, like a cellular mobile-radio network or another wireless network like Bluetooth or NFC.

Figure 2:
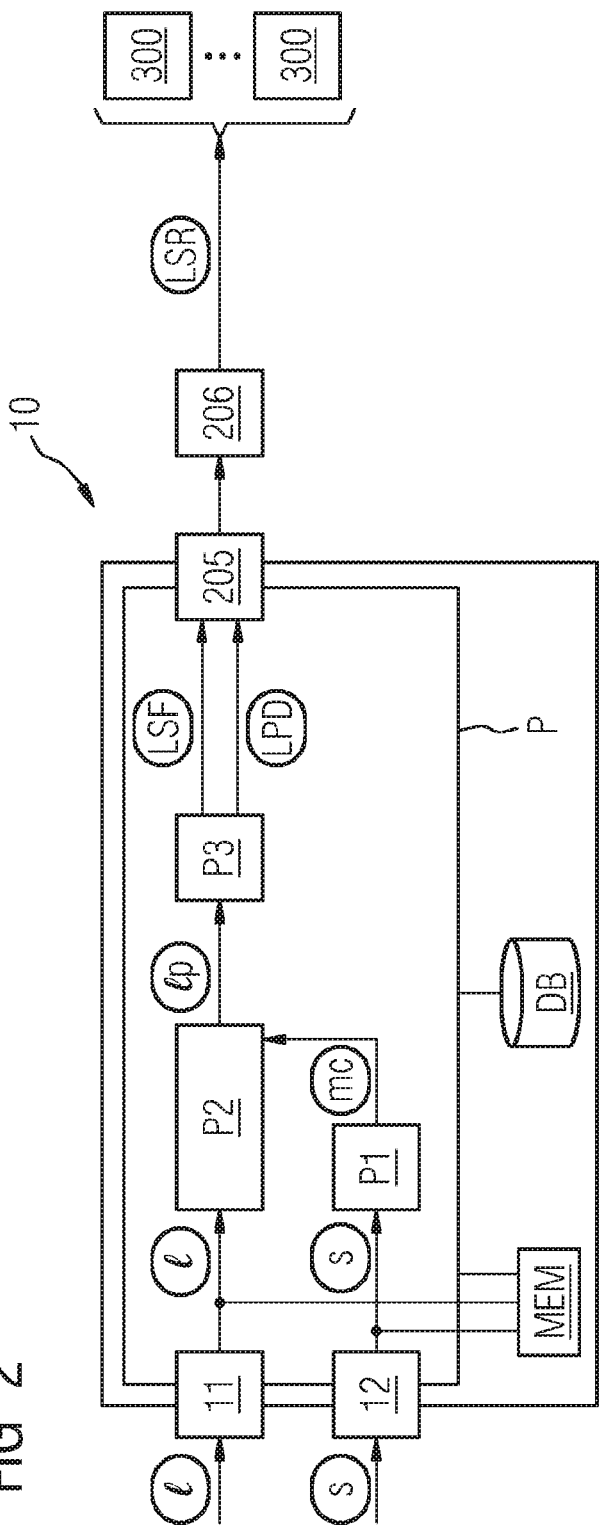
FIG. 2 shows a block diagram of a calculation unit according to an embodiment of the present invention of FIG. 1 in more detail.

FIG. 2 shows an embodiment of a calculation unit 10 in more detail. The calculation unit 10 may be embedded in a server 200. The calculation unit comprises a processor as core part for providing different specific data processing functionality. The processor P has a load interface 11 for receiving a continuously measured load signal l over time, indicating a generated load of the turbine GT during operation thereof. The load signal l may therefore represent the actual generated energy or electrical capacity.

The processor P further comprises a sensor interface 12 for receiving continuously measured sensor signals s, representing operating parameters of the turbine GT during operation of the same. The operating parameters represent operating conditions of the turbine GT. The operating conditions are thus covered by the measured sensor signals s that for example measure temperature, pressure, and other operational status parameters of the turbine GT etc. that influence the maximum capacity. Parameters like "fired starts", "fast starts", "frequency of starts and stops" and other maintenance-related parameters influence the lifetime and should be considered in calculation of the lifetime. These parameters, however, do not go into the calculation of the load skewness result and load skewness factor LSF, but may be used for further processing of the load skewness result LSR, inter alia for calculation of service intervals and/or remaining life time.

A first unit P1 is dedicated for determining a maximum capacity signal mc, wherein the maximum capacity signal mc is calculated based on the received sensor signals s, received via sensor interface 12. The maximum capacity signal mc indicates a maximal possible load to be generated at that time, considering operating conditions of the turbine GT. It is used for ISO correction.

A second unit P2 is adapted for determining a load percentage signal lp over time. The load percentage signal lp is calculated by determining the deviation of the received load signal l from the determined maximum capacity signal mp.

The load percentage signal lp is provided for each of the units or turbine sites. The load percentage signal lp may for example be shown as a graph over an 8 days period. In case processing resources are not sufficient to process huge amount of data, the data may be aggregated as for example average over 10 minutes, since otherwise the amount of data might be too high for visualization. Also missing data may be interpolated. Data, however, does not necessarily be aggregated like this. The raw signal can also be used, or the aggregation can be on 1 minute or one hour, depending on the amount of data and on the computing resources. The aggregation can thus be activated and deactivated dynamically. Although for the method in general the aggregation is not necessary, an aggregation module is advantageous in case the analysis of non-aggregated data would take too long.

A third unit P3 is adapted for determining a load percentage distribution LPD based on the determined load percentage signal lp. The third unit P3 is further adapted to calculate a load skewness factor LSF as a measure of an asymmetry of the calculated load percentage distribution LPD.

In a simple embodiment, the provided load skewness result LSR may be transmitted to other computing entities via appropriate interfaces (http-based, WLAN, USB port etc.) for further processing on external devices.

In another embodiment, a web player server 205 is adapted for providing the load skewness result LSR, comprising the calculated load percentage distribution LPD and the calculated load skewness factor LSF. The web player server 205 interacts with a web player client 206, which provides the technical basis that external clients 300 may connect to the server-based system 200.

In an embodiment, the load skewness result LSR is made available for external devices like the client devices 300 with a client dashboard 301. The dashboard 301 thus serves as output interface, which may be presented on a monitor M. The (centrally deployed) server part of the dashboard, the web player server 205 and the web player client 206 may be adapted to interact and to control the respective browser tool or dashboard 301 which is deployed at the local site of different users 100, 300, like e.g. a customer site, a development unit or a service unit etc. The received signals l, s may be stored in a memory MEM, which may be integrated into the calculation unit 10 or within the server 200. The processor P may also access a database DB for further queries and for storing original signals l, s and results and intermediate results lp, LSF, LPD and related metadata.

Figure 3:
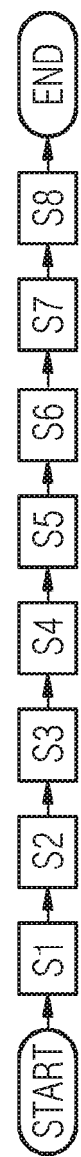
FIG. 3 is a flow chart, depicting steps of a method for calculating a load skewness result and a visualization for it.

FIG. 3 is a flow chart of the method according to an embodiment of the present invention. After Start of the method, in step S1 the load signal l is received from the turbine GT. In step S2 sensor signals are received from the turbine GT. In a first embodiment the received signals l, s are acquired during instant operation of the turbine GT and are processed quasi simultaneously or in parallel. In a second embodiment, the signals l, s are received from an interface or from a memory MEM and refer to historical or former turbine operation.

In step S3 the maximum capacity signal mc is calculated from the received sensor signals. The calculated maximum capacity signal mc is forwarded to the third unit P3 to determine the load percentage signal lp in step S4, as a signal over time (difference signal between maximum capacity signal mc and load signal l). Generally, the maximum capacity signal mc only serves as a basis for further calculations and will not be shown on a dashboard. In step S5 the load percentage distribution LPD is calculated. In step S6 the load skewness factor LSF is calculated and in step S7 the load skewness result LSR is provided with a combination of the load percentage distribution LPD and the load skewness factor LSF. The result LSR is provided for visualization on the respective client site's dashboard 301 in step S8. Preferably, the load skewness factor LSF is visualized as a signal over time, wherein the time interval may be determined in a configuration step before. After this the method ends or may be iterated.

FIG. 4 shown another embodiment, similar to the one described above in FIG. 2, represented in a block diagram of a system architecture with a schematic representation of a fleet gas turbines $GT_1$, $GT_2$, ... $GT_n$ with associated client computing units 100 and a (central) server unit 200. It is to be noted, that all or a part of the features and aspects which have been explained above with respect to FIG. 2 may also apply in this embodiment, although not explicitly explained here and vice versa. The respective modules, which will be explained in more detail below do correspond to respective method steps in the method. E.g. the correction module 201 corresponds to the step of correcting or the interpolation module 202 corresponds to the step of interpolating etc.

The client computing units 100 may comprise a browser-based frontend client tool 110, which is adapted to provide results LSD, LSF, LSR and data l, s of a server-based calculation on a local monitor M or another tool. The browser-based frontend client tool 110 is deployed at the customer site 100, who can also have several gas turbines GT, but just one such browser-based frontend client tool 110, which will be centrally used for all gas turbines GT at that site. The several turbines GT and associated computing units 100 may be referred to as customer entity. The turbines $GT_1$, $GT_2$, ... $GT_n$ are in data exchange with a central server unit 200. The central server unit 200 may comprise a central database DB or may be in data exchange with such a database DB.

Sensor data are acquired at the gas turbines GT, comprising a load signal l and sensor data s. The acquired data l, s is provided to the central server unit 200 and first go through different computation units before being delivered to dashboard applications. The computations will now be described in more detail.

In FIG. 4 a data correction module 201 is provided for failure correction of received sensor data. For example, it may be detected if all received sensor data l, s is valid and are correctly received. Also, an outlier analysis may be executed. Moreover, automatic correction means may be provided, comprising an ISO-correction. Further, it is possible to aggregate the relevant data over sever time intervals (e.g. by applying a mean function) for reducing the data volume which needs to be processed by further modules 202, 203. In a first embodiment the calculation unit 10 may be equal to the server 200, whereas in other embodiments, the server 200 may comprise additional modules and units for data processing. Moreover, in FIG. 4, the time sequence of the execution of the functions and algorithms implemented in the respective modules should be depicted.

A data interpolation module 202 is provided for interpolating sensor data if it turns out to be necessary. This is e.g. the case, if it turns out that intermediate data are needed for further processing and only data for a part of all timepoints in the period do exist. By using the interpolation module 202 or by applying the interpolation the technical effect is achieved to provide synchronized data, all having the same time basis or gird/pattern. Only data, having an identical time basis (grid) may be used for ISO correction or ISO correction module 203.

An ISO-correction module 203 is provided which processes the corrected and optionally interpolated signals s, l together with a nominal load which is provided as well to calculate a load percentage signal lp over time.

Based on the calculated load percentage signal lp a load skewness result calculator 204 may be used to calculate the load skewness result LSR.

The load skewness result LSR may be provided to a web player server 205 which hosts different dashboards applications (with different functionality for processing the result data LSR) which interact with a web player client 206, which provides the option to be accessed from different external client devices 300. The client devices 300 need not to be deployed with special soft—and/or hardware and may thus be provided as thin client in different contexts, for example for turbine development, for turbine maintenance and service and or as turbine operator or others. A user may only use a browser with a URL-link to connect to the web player client 206 at the central server 200 to establish a connection to the application running on the web player client 206 on the server 200.

Data from the turbines GT is directly provided to the central database DB in the server unit 200 and from there to the processing modules 201, 202, 203, 204, mentioned above.

Several visualization applications are provided on the web player client 206 of the server unit 200. For example, a first dashboard for customers and a second dashboard for designers and further dashboards, e.g. for engineers may be provided. The browser acts as client tool for providing a dashboard application for accessing and connecting with the central services.

The server 200 may use three different electronic (software and/or hardware) modules: —A data correction module 201; —An interpolation module 202; and—An ISO correction module 203 for processing a received nominal load signal with the received corrected and interpolated signals s, l to calculate an intermediate result with the load percentage signal lp.

In addition, the calculation unit 10 may act as skewness calculation module at the server 200. The modules and units 201, 202, 203, 204 may be adapted to implement the algorithms, mentioned above to be executed for providing the load skewness factor LSF.

The central server unit 200 and the web player client 206 in particular, typically is in data connection with a turbine development service module which acts as browser-based frontend client tool 110, which may be controlled via a browser interface, too. The turbine development service module may be used to provide the load skewness result LSR with the load skewness factor LSF, as well.

The central server unit 200 or the calculation unit 10 may comprise or communicate with another module that uses the calculated load skewness factor LSF to compute lifetimes and service intervals and a dashboard can be used to do this interactively. But the dashboard is deployed on the web player server 205 and web player client 206. The computing entities 100, 300, which are connected to the server 200, receive the centrally calculated load skewness result r and may visualize the same and/or may process the related data. The visualizations are computed via centrally generated dashboards.

FIG. 5 shows the computing unit of the client's site 300 in more detail. It comprises a monitor M which serves to provide the client dashboard 301 for visualizing the calculated load skewness result LSR. The tool could also be used at the turbine's site of the turbine operator 100 by using frontend client tool 110 for gas turbine (not shown in FIG. 5 explicitly).

The load skewness result LSR consists of two aspects:

1. The load percentage distribution LPD can show the amount of time a machine runs in specific load percentage bins. Here the customer can see how a machine was run in the past and—in comparison to that—can describe how this or another machine will be run in the future.

2. The load skewness factor LSF defines a single, meaningful value to the distribution. It can be used in a contract to quantify the usage of the machine. Since it correlates to the failure behavior of the machine, engineers can quantify uncertainties in the life time of parts better than using load classes.

The server 200 may be adapted for distributed processing of large datasets in a database.

The load skewness factor is the skewness of the load signal. So, it tells how much the distribution of the load differs from a symmetric distribution. If the distribution is steeper on the right side, so more values are higher than the average, it is called left skewed. If the load skewness is calculated over the load values per month, then it is possible to show a graphic how the skewness changes over several months. The load skewness factor LSF is just one value for the respective distribution and thus, very efficient and easy to perceive. The result further comprises the skewness over time. Depending on the granularity of the time axis over which the skewness is calculated (per day, per week, per month, per year, . . . ) different patterns can be found and conclusions can be drawn. Maybe in the first month it is right-skewed, it gets less right-skewed, then gets symmetric and in the latest months it gets left-skewed. Or the load skewness factor LSF is different in winter than in summer or different in the first week of a month etc. Also, in another processing load skewness factors LSF and/or graphs can be compared between different gas turbines GT.

As can be seen in the example shown in FIG. 5, on the left side for five months 2014-4, 2014-5, 2014-6, 2014-7 and 2014-9 the load percentage signal lp is depicted in bins for the same turbine (load percentage distribution LPD). ISO corrected data is aggregated over 10 minutes by average. The data is collected for one turbine GT and one month in bins for ranges of load percentage. In this example, the bins are depicted on the x-axis and refer to a first bin with x<=40, a second bin refers to the range 40<=x<=50 up to a seventh bin with 90<=x<=100. On the right side in FIG. 5 a graph is shown for the load skewness factor LSF. On the x-axis the five months, corresponding to the bins of the left side visualization are shown and the y axis refers to the values of the load skewness factor LSF, which in this case is negative but has different values ranging from −1,2 to −1,4. On the right side, the skewness factors or values for the same turbine and the five different months are shown. The values are negative, since the data is not symmetric and tends to be more on the right side (left-skewed). The skewness factors could also be positive if the data would be more on the left side. Here, the differences between the months are only small.

The scope of protection of the present invention is specified by the appended claims and is not restricted by the features explained in the description or shown in the drawing.

The invention claimed is:

1. A method for calculating with a processor a load skewness result for a determination of service intervals for a turbine, based on historical and continuously measured sensor data of turbine operation, the method comprising:
   equipping the gas turbine with a plurality of sensors;
   receiving from a respective sensor of the plurality of sensors a continuously measured load signal over time, the load signal indicative of a load of the turbine during operation of the turbine;
   storing the continuously measured load signal in a memory;
   accessing with the processor the memory to determine a load percentage signal over time as a deviation of the received measured load signal with respect to a maximum capacity signal, wherein the maximum capacity signal represents a maximal possible load to be generated at a given time and is calculated from continuously measured sensor signals from further respective sensors of the plurality of sensors, the continuously measured sensor signals representing operating parameters of turbine operation;
   calculating with the processor a load percentage distribution based on the determined load percentage signal;
   calculating with the processor a load skewness factor as a measure of an asymmetry of the calculated load percentage distribution; and
   generating a graphical representation indicative of the load skewness result, the graphical representation supplied to a graphical user interface to simultaneously display the calculated load percentage distribution over time and the calculated load skewness factor over time.

2. The method according to claim 1, wherein the load skewness factor is calculated by:

$$LSF = \frac{n\sqrt{n-1}}{n-2} \frac{\sum_{i=1}^{n}(x_1 - x_{avg})^2}{\left(\sum_{i=1}^{n}(x_1 - x_{avg})^2\right)^{3/2}}$$

wherein LSF is the load skewness factor and n is the number of samples,
wherein a sample is a value of the load percentage signal at given time, $x_i$ is the value of each load percentage signal and $x_{avg}$ is the arithmetic mean of all load percentages.

3. The method according to claim 1, wherein the measured sensor signals, representing the operating parameters of the turbine operation, comprise a temperature signal, a pressure signal, a humidity signal of inlet air to the turbine, a heating signal for the fuel, an outlet pressure signal for outlet exhaust gases of the turbine.

4. The method according to claim 1, wherein the method further comprises:
visualizing the load skewness result on the graphical user interface by way of a browser-based frontend client tool or a client dashboard.

5. The method according to claim 1, wherein the measured load signal and the determined load percentage signal are historical data, which is storable locally on a historical data memory disposed at a site of the turbine.

6. The method according to claim 1, wherein the load skewness result comprises an accuracy result dataset, which is calculated by measuring a difference between expected values of the load percentage distribution with respect to currently measured values of the load percentage distribution.

7. The method according to claim 1, wherein the calculated load skewness factor is used for determination of future service intervals of the turbine.

8. The method according to claim 1, wherein the measured and determined signals are preprocessed by checking formal correctness.

9. The method according to claim 1, wherein the provided load skewness result is used for calculation of probabilistic lifetime of the turbine and its components, wherein the calculation is modeled so that the continuously measured operating conditions dynamically influence the continuously calculated probabilistic lifetime.

10. A computer program, embodied in a tangible, non-transitory machine-readable storage medium, including instructions operable to cause a computing entity to perform the method steps according to claim 1.

11. A method of using the load skewness result, comprising: calculating the load skewness result according to a method of claim 1, using the load skewness result in order to assess the risk of failure during operation of a turbine, optimize the maintenance intervals of a turbine or combinations thereof.

12. A processor comprising a calculation unit for calculating a load skewness result for a determination of service intervals for a turbine, based on historical and continuously measured sensor data of turbine operation, comprising:
   a plurality of sensors operatively coupled to the turbine;

a load interface coupled to a respective sensor of the plurality of sensors to receive a continuously measured load signal over time, the load signal indicative of a load of the turbine during operation of the turbine;

a sensor interface coupled to further respective sensors of the plurality of sensors to receive continuously measured sensor signals, the continuously measured sensor signals representing operating parameters of the turbine;

the processor having a first processor unit configured to determine a maximum capacity signal, wherein the maximum capacity signal is calculated based on the received sensor signals and indicates a maximal possible load to be generated at that time;

the processor having a second processor unit configured to determine a load percentage signal over time as a deviation of the received load signal from the maximum capacity signal;

the processor having a third processor unit configured to determine a load percentage distribution based on the determined load percentage signal and which is further configured to calculate a load skewness factor as a measure of an asymmetry of the calculated load percentage distribution;

the processor configured to generate a graphical representation indicative of the load skewness result; and a graphical user interface responsive to the graphical representation to simultaneously display the calculated load percentage distribution over time and the calculated load skewness factor over timer.

13. A calculation unit for calculating a load skewness result for a determination of service intervals for a turbine, based on historical and continuously measured sensor data of turbine operation, comprising:

a load interface for receiving a continuously measured load signal over time, the load signal indicative of a load of the turbine during operation of the turbine;

a sensor interface for receiving continuously measured sensor signals, the continuously measured sensor signals representing operating parameters of the turbine;

a first unit configured to determine a maximum capacity signal, wherein the maximum capacity signal is calculated based on the received sensor signals and indicates a maximal possible load to be generated at that time;

a second unit configured to determine a load percentage signal over time as a deviation of the received load signal from the maximum capacity signal;

a third unit configured to determine a load percentage distribution based on the determined load percentage signal and which is further configured to calculate a load skewness factor as a measure of an asymmetry of the calculated load percentage distribution;

an output interface configured to provide a graphical representation indicative of the load skewness result; and a graphical user interface responsive to the graphical representation to simultaneously display the calculated load percentage distribution over time and the calculated load skewness factor over time.

\* \* \* \* \*